US007917034B2

(12) United States Patent
Yu et al.

(10) Patent No.: US 7,917,034 B2
(45) Date of Patent: *Mar. 29, 2011

(54) SYNCHRONIZATION AND PROCESSING OF SECURE INFORMATION VIA OPTICALLY TRANSMITTED DATA

(75) Inventors: Huinan Yu, Kildeer, IL (US); Aroon V. Tungare, Winfield, IL (US); John R. St. Peter, Elburn, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 979 days.

This patent is subject to a terminal disclaimer.

(21) Appl. No.: 11/735,197

(22) Filed: Apr. 13, 2007

(65) Prior Publication Data

US 2008/0253766 A1 Oct. 16, 2008

(51) Int. Cl.
*H04B 10/00* (2006.01)
(52) U.S. Cl. ........ 398/115; 398/107; 398/108; 398/128; 398/130
(58) Field of Classification Search .......... 398/128, 398/130, 127, 118, 135, 138, 140, 151, 106, 398/107, 108, 109, 111, 41, 164, 115
See application file for complete search history.

(56) References Cited

U.S. PATENT DOCUMENTS

| 5,239,295 | A | * | 8/1993 | DeLuca et al. ............... 340/7.4 |
| 5,701,189 | A | | 12/1997 | Koda et al. |
| 6,014,236 | A | | 1/2000 | Flaherty |
| 6,563,619 | B1 | * | 5/2003 | Hirayama et al. ............ 398/121 |
| 6,685,093 | B2 | | 2/2004 | Challa et al. |
| 6,720,863 | B2 | | 4/2004 | Hull et al. |
| 6,985,069 | B2 | * | 1/2006 | Marmaropoulos ............ 340/3.9 |
| 7,028,906 | B2 | | 4/2006 | Challa et al. |
| 7,047,560 | B2 | | 5/2006 | Fishman et al. |
| 2002/0065065 | A1 | | 5/2002 | Lunsford et al. |
| 2003/0050009 | A1 | | 3/2003 | Kurisko et al. |
| 2005/0094838 | A1 | | 5/2005 | Tomoda et al. |
| 2006/0056855 | A1 | * | 3/2006 | Nakagawa et al. ........... 398/183 |
| 2006/0256070 | A1 | | 11/2006 | Moosavi et al. |

(Continued)

FOREIGN PATENT DOCUMENTS

EP 1564914 8/2005

(Continued)

OTHER PUBLICATIONS

McCune et al, "Seeing-Is-Believing: Using Camera Phones for Human-Verifiable Authentication," Proceedings of the 2005 IEEE Symposium on Security and Privacy (S&P'05), May 8-11, 2005, pp. 110-124.

(Continued)

*Primary Examiner* — M. R. Sedighian
(74) *Attorney, Agent, or Firm* — Dillon & Yudell, LLP; Sylvia Chen, Esq.

(57) ABSTRACT

A method and device enables data communication via optical pulses from a light source of an electronic device. A data transfer interface is provided to support processing of selected data by a processor of the electronic device. The electronic device comprises an illumination light source, which is selectively utilized for illuminating a component in the electronic device and for transmitting data via optical pulses. An optical receiver also receives optically transmitted data. The transmission and receiving of the data is provided on a bidirectional duplex communication link created with a second optical receiver and an optical data transmission mechanism of a second electronic device.

26 Claims, 13 Drawing Sheets

U.S. PATENT DOCUMENTS

| | | |
|---|---|---|
| 2007/0024571 A1 | 2/2007 | Maniam et al. |
| 2007/0116293 A1 | 5/2007 | Busser et al. |
| 2008/0238725 A1 | 10/2008 | Gitzinger et al. |
| 2008/0247759 A1 * | 10/2008 | Bahar ............... 398/118 |

FOREIGN PATENT DOCUMENTS

| | | |
|---|---|---|
| EP | 1724951 | 11/2006 |
| EP | 1811715 A1 | 7/2007 |
| JP | 402131633 * | 2/1990 |
| WO | 02-084635 A1 | 10/2002 |
| WO | WO2007037122 | 4/2007 |

OTHER PUBLICATIONS

Marlene Benigar, "International Search Report and Written Opinion," WIPO, ISA/EPO, Oct. 15, 2008.

International Search Report and Written Opinion, PCT/US2008/059818, EPO, Jul. 14, 2008.

* cited by examiner

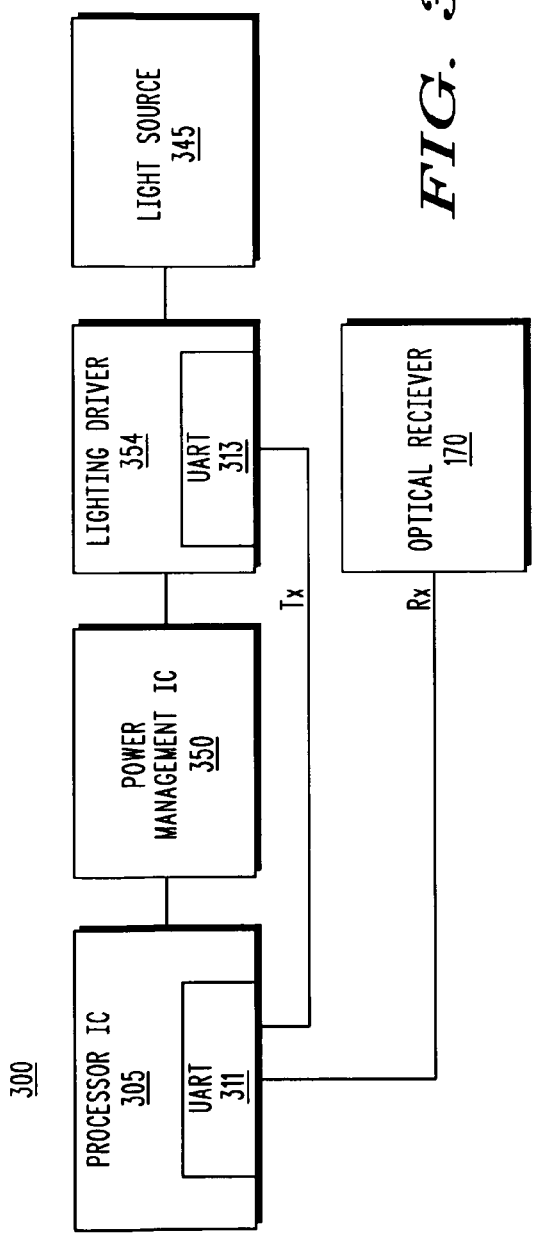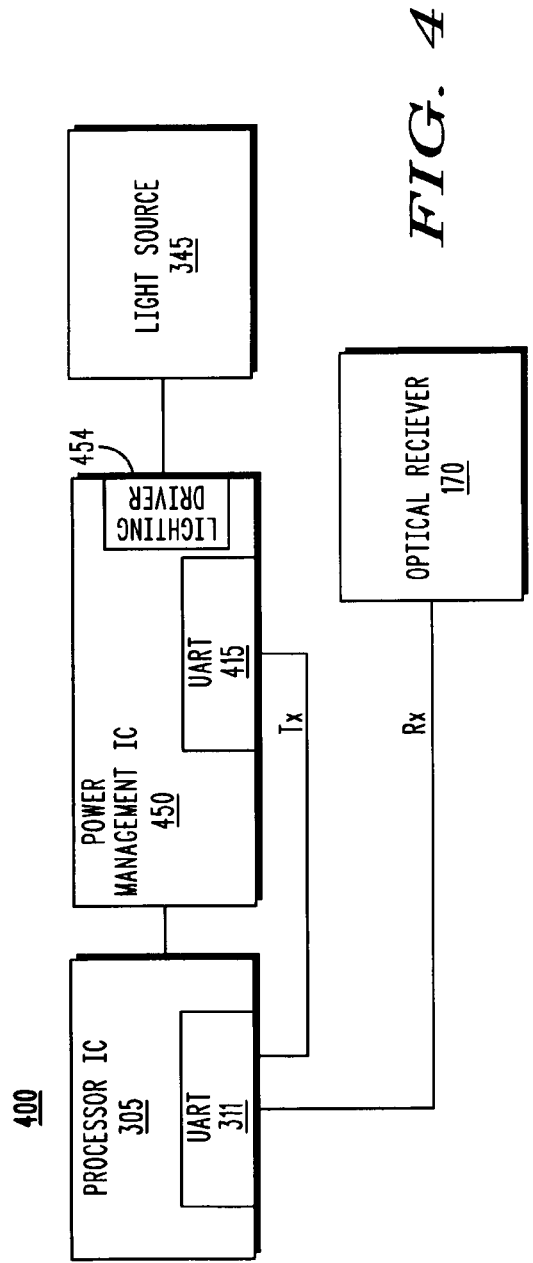

SYNCHRONIZATION AND PROCESSING OF SECURE INFORMATION VIA OPTICALLY TRANSMITTED DATA

RELATED APPLICATIONS

The present application is related to the following co-pending U.S. patent application filed on even date herewith and incorporated herein by reference in its entirety: Ser. No. 11/851,086, entitled "COMMUNICATING INFORMATION USING AN EXISTING LIGHT SOURCE OF AN ELECTRONIC DEVICE."

BACKGROUND OF THE INVENTION

1. Technical Field

The present invention relates generally to electronic devices and in particular to data transmission from electronic devices. Still more particularly, the present invention relates to mechanisms for providing secure, short range wireless data transmission from electronic devices.

2. Description of the Related Art

Portable electronic devices, such as mobile (or cellular) phones, have become standard equipment used by a growing number of people throughout the world for voice communication. In addition to providing voice communication, a large number of portable electronic devices now offer data communication and multimedia functions. Due to the extremely high penetration rate of these electronic devices, developers continue to expand the capabilities of the devices to perform other user-desired functions.

A number of technologies are developed to enable short range wireless data transfer between portable electronic devices. One widely implemented method involves utilization of specialized infrared (IR) diodes placed in the portable electronic device. These IR diodes are utilized to connect (or "synch") two devices with each other by aligning the IR ports to create an infrared optical data link that is then utilized to transmit the data. A large number of portable electronic devices are now equipped with duplexed optical (IrDA) communication ports to enable peer-to-peer data communication/exchange.

Bluetooth provides another way of wirelessly exchanging information between electronic devices. The protocol operates in the license-free ISM (Industrial, Scientific and Medical) band at 2.45 GHz and offers 1 Mbps (mega bits per second) Basic Rate and 2-3 Mbps with Enhanced Data Rate. Bluetooth has become a popular technology to facilitate wireless control of voice communication using hands free headset from a cell phone or a vehicle.

Another technology offering information transfer from a portable electronic device is Near Field Communication (NFC). Based on Radio Frequency Identification (RFID) technology, the NFC standard offers 212 kbps over a distance from 0 to 20 centimeters at the 13.56 Mhz frequency range. The short operation range suggests higher level of security for wireless information transfer than other RF wireless communications technologies, thus making NFC suitable for applications such as ticketing, payment and gaming. NFC supports a power saving passive mode of communication in which a passive or unpowered tag can be powered at a distance by a reader device. However, possibilities exist for the device to be "interrogated" unknowingly when functioning in the passive mode.

The above mentioned short range wireless communication technologies all require dedicated RF components or optical transceivers, adding area/size and cost to the increasingly smaller electronic device.

SUMMARY OF ONE EMBODIMENT

A method and device enables data communication via optical pulses from a light source of an electronic device. A data transfer interface is provided to support processing of selected data by a processor of the electronic device. The electronic device comprises an illumination light source, which is selectively utilized for illuminating a component in the electronic device and for transmitting data via optical pulses. An optical receiver also receives optically transmitted data. The transmission and receiving of the data is provided on a bidirectional duplex communication link created with a second optical receiver and an optical data transmission mechanism of a second electronic device.

The above as well as additional objectives, features, and advantages of the present invention will become apparent in the following detailed written description.

BRIEF DESCRIPTION OF THE DRAWINGS

The invention itself, as well as a preferred mode of use, farther objects, and advantages thereof, will best be understood by reference to the following detailed description of an illustrative embodiment when read in conjunction with the accompanying drawings, wherein:

FIGS. 3 and 4 provide block diagram representations of driver configurations by which modulated optical signals representing data ("optically-transmitted data") may be generated for transmission by a light source of an electronic device in accordance with embodiments of the invention;

DETAILED DESCRIPTION OF AN ILLUSTRATIVE EMBODIMENT

Figure 1:
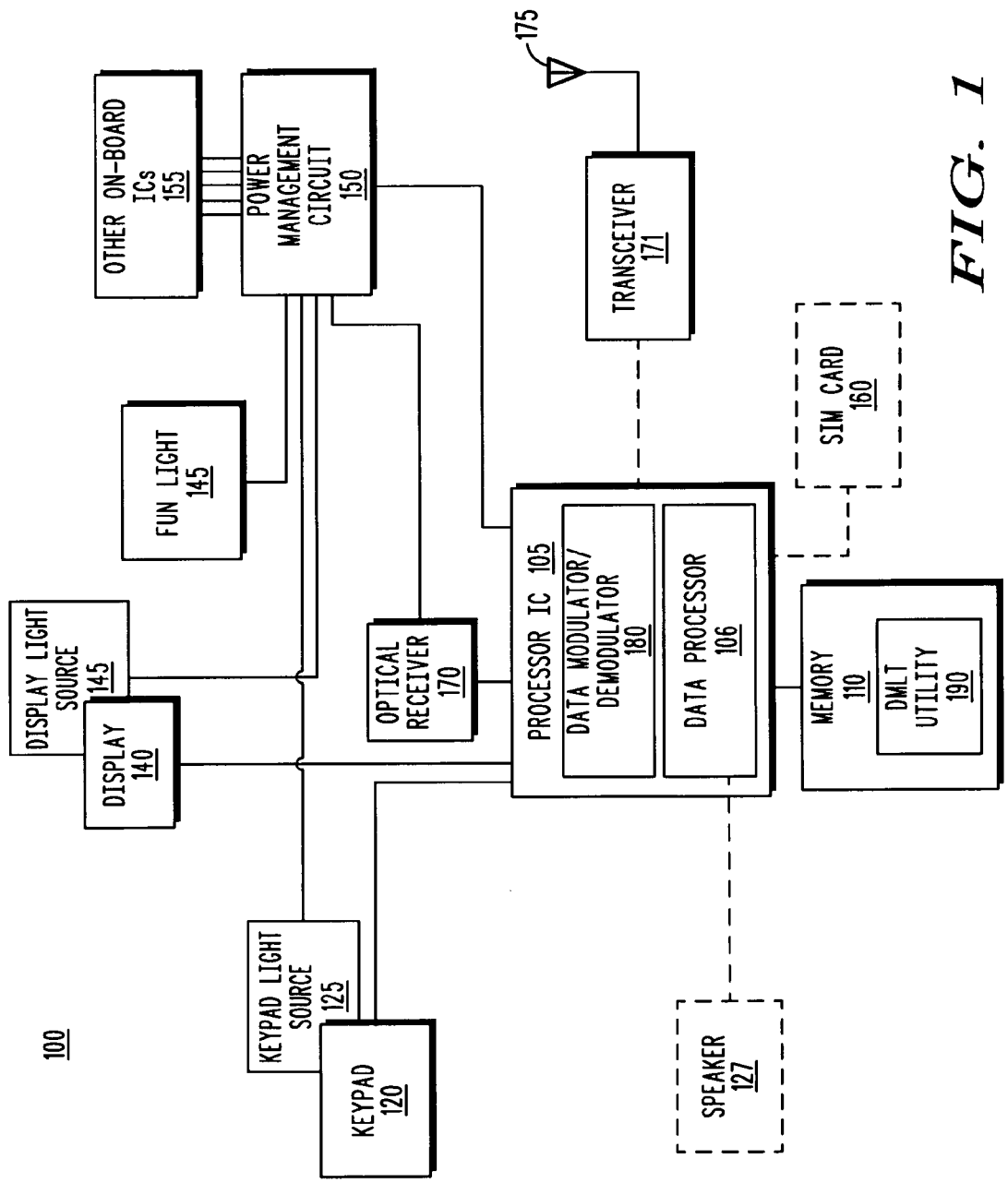
FIG. 1 is a block diagram illustrating an example electronic device, which includes components for enabling short range data communication via illumination light source of a display, keypad or fun light, in accordance with embodiments of the invention.

According to some embodiments, an electronic device includes a data processor for generating a data stream for communication with an external device. The electronic device also includes an illumination light source for illuminating components within the electronic device and which provides modulated optical signals indicative of the data stream ("optically-transmitted data) generated from the data processor. A power management circuit is operatively connected to the data processor and to the illumination light source. The power management circuit selectively drives the illumination light source with power levels optimized for illuminating the components or with power level modulation indicative of the data stream generated from the data processor. The electronic device also includes an optical receiver by which the electronic device receives modulated optical signals containing a data stream generated from another device.

Additionally, according to other embodiments, a method and device enables data communication via optical pulses from a light source of an electronic device. A data transfer interface is provided to support processing of selected data by a processor of the electronic device. The electronic device comprises an illumination light source, which is selectively utilized for illuminating a component in the electronic device and for transmitting data via optical pulses. An optical receiver also receives optically transmitted data. The transmission and receiving of the data is provided on a bidirectional duplex communication link created with a second optical receiver and an optical data transmission mechanism of a second electronic device.

In one embodiment, the electronic device includes a display, such as a liquid crystal display (LCD), and a display light source (often referred to as a backlight). In a next embodiment, the electronic device includes a group of funlight LEDs that may be modulated to provide the optically-transmitted data. In yet another embodiment, the light source is a keypad light source, which illuminates the keypad of the electronic device when the keypad light source is utilized for illumination and which provides optically-transmitted data when the keypad light source is utilized for data communication/transmission. Another embodiment includes the optical modulation of light that is transmitted by a self-illuminating display of the electronic device. With this embodiment, the display is an emissive type and the light source is a part of the display rather than being a separate light source. In each embodiment, modulation of the light is provided by the power management circuit, which is operationally connected to the respective light source(s) and to the data processor of the electronic device.

In the following detailed, description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to an electronic device, which is specifically illustrated as a mobile phone, it will be appreciated that the present invention can be applied to other devices such as MP3 players, personal multimedia players, PDAs (Personal Digital Assistants), and similar portable devices, and application of the invention is not limited to mobile phones.

Also, it is understood that the use of specific terminology and/or nomenclature are for example only and not meant to imply any limitations on the invention. The invention may thus be implemented with different nomenclature/terminology utilized to describe the various parameters/components/devices/utilities, without limitation. For example, the embodiments are generally described from the perspective of enabling transmission of a data stream as optically-transmitted data. However, as utilized herein, the term "data" (or optically-transmitted data) refers to any information that may be utilized to modulate a light source, such that the modulated light source transmits a signal that is representative/indicative of the information when the light signal is de-modulated. Use of the term data is thus intended to refer generally to any type of electronic information that may be transmitted as optical signals.

Further, within the description of embodiments of the invention, the term modulating (or optically modulating) is utilized to generally refer to the process of changing one or more characteristics of a light source, such that the light signals emanating from the light source are representative/indicative of specific information provided by the data processor. The term may also refer to some form of encoding (e.g., optically encoding) or embedding of data within the light, which is accomplished by changing characteristics of (or modulating) the light source. De-modulation then refers to the reverse process of removing/interpreting the data from a received light that has been modulated to provide signals representing the original data that is optically-transmitted.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Figure 2:
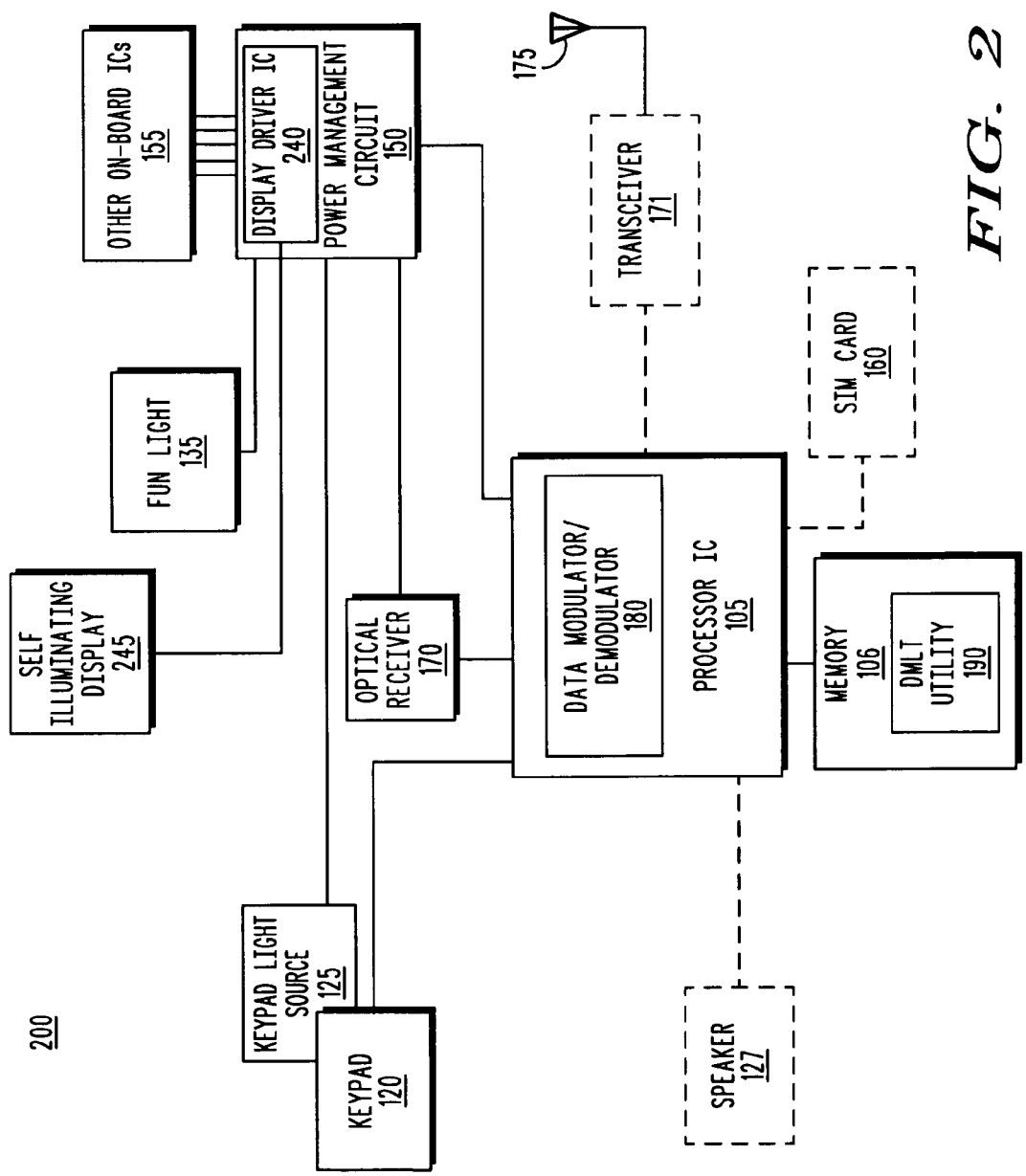
FIG. 2 is a block diagram illustrating an example electronic device, which includes components for enabling short range data communication via a self illuminating display, in accordance with one embodiment of the invention.

With reference now to the figures, FIGS. 1 and 2 are block diagram representations of an example electronic device, which is designed with the functional components (hardware and software/firmware) required to enable an illumination light source to be modulated to provide optical transmission of data (or a data stream) from the electronic device, in accordance with embodiments of the invention. Most of the components of FIGS. 1 and 2 are similar and thus the figures are described together. However, separate descriptions are provided where the components differ between the two illustrated devices. As will become clear in the following description, the primary distinctions in the two illustrations is the type of light source that is modulated to produce the optically modulated signals representing the data stream provided by the respective data processors.

As illustrated by FIGS. 1 and 2, electronic device 100/200 comprises processor integrated circuit (IC) 105, which is connected to memory 110. Processor IC 105 may include a programmable microprocessor (data processor 106), as well as a digital signal processor (DSP) that controls the communication and other functions/operations of electronic device 100/200. These functions/operations include, but are not limited to, data processing and signal processing, as initiated within electronic device 100/200. Additionally, the functions/operations of the programmable microprocessor (data processor 106) include the generation of a stream of data according to a communication protocol and interface and triggering a modulation of a light source to generate an optically-transmitted data, representative of the data stream. In one embodiment, the programmable microprocessor (data processor 106) also performs the functions of processing signals received by the optical receiver, which signals contain optically-transmitted data generated at another device. To support both the data-to-light modulation and light-to-data demodulation functions, processor IC 105 comprises data modulator/demodulator 180.

Data modulator/demodulator 180 may be a hardware component or a software utility that operates along with the microprocessor and the power management circuit 150 to support the optical modulating functions on the provided data (or data stream). In one embodiment, data modulator/demodulator 180 is operatively coupled to a serial data communication interface of the data processor 106. Data modulation functions may be provided by a separate component from data processing functions, but are illustrated as combined within a single component (data modulator/demodulator 180) for ease of description. Data modulator/demodulator 180 is also operationally coupled to optical receiver 170 to support demodulation functions of optical receiver 170 on received light that is modulated to represent optically-transmitted data. It is appreciated that the functionality of data modulator/demodulator 180 may be provided as software code within one or more of the illustrated components to which data modulator/demodulator 180 is shown operationally connected. The specific illustration of the data modulator/demodulator 180 is thus not meant to imply any structural, functional or other limitations on the invention.

Processor IC 105 is coupled to power management circuit 150, which controls the allocation of electrical power to the various components of electronic device 100/200. Processor IC 105 receives electrical power via power management circuit 150, which couples to a power source, such as a battery or a charging circuit (not shown). Power management circuit 150 also provides electrical power to the various light sources, described below, as well as other on-board ICs 155.

Electronic device 100/200 also comprises input devices, of which keypad 120 is illustrated, connected to processor IC 105. In the illustrative embodiment, keypad 120 is illuminated by keypad light source 125, which is coupled to power management circuit 150. Additionally, electronic device 100/200 comprises output devices, which are each connected to processor IC 105 and to power management circuit 150. Specifically, electronic device 100 in FIG. 1 comprises funlight 135 and display 140, and display light source 145. Display 140 may be a transmissive display, or a transflective display, or a reflective display.

In one embodiment, display device 140 comprises a Liquid Crystal Display (LCD) having optical shutters that open and close specific pixels based on received display commands. The LCD may display a white screen during data transfer to maximize optical data transmission efficiency. LCD may also display monochrome patterns such as red, green and blue, when similar monochrome lights such as RGB (Red, Green & Blue) are provided in the display light source so that multiple data channels can be created and utilized for concurrent transmission of one or more data streams. In this embodiment, each primary color may be assigned to a different data stream, or alternatively, the same data stream may be transmitted via multiple different color sources at different frequencies and wavelengths. Features of the invention may also apply to a CLI (caller line identification) illumination light source, in an alternative embodiment.

Depending on the design of electronic device 100/200, keypad light source 125 and/or funlight 135 and/or display light source 145 may be one of (a) at least one point light source comprising light emitting diodes (LEDs), (b) a planar light source comprised of organic light emitting diodes (OLEDs), and (c) a planar light conduit optically coupled to the one or more point light sources. Other embodiments may provide for different display light sources. The light source for display 140 or keypad 120 could be illuminating from the back or from the front. In back illumination implementation, light transmitted from the display/keypad is used to communicate with an external device. In the front illumination implementation, light reflected or diffracted from the display/keypad is used to communicate with an external device. In one embodiment the same illumination light source illuminates both the display and keypad and/or communicates with an external device.

In several of the described embodiments, the light sources (125, 135, 145) comprise a plurality of LEDs, which may be individually powered on/off and range in intensity based on the amount of power applied by power management circuit 150, when the device is in optical data communication mode. The plurality of LEDs may also be used to provide optimum illumination condition for display, keypad or funlight functions, when the device is not in the optical data communication mode. The microprocessor within processor IC 105 generates control signals that trigger certain responses by power management circuit 150, such as controlling the amount of power to apply to the light source (e.g., display light source 145) and/or which LEDs within the light source (145) to illuminate.

With these implementations, the light sources (125, 135, 145) are utilized for both illumination functions and communication functions. The described embodiments thus expand the functionality of a conventional illumination light source to serve as part of an optical data communication interface.

Keypad light source 125, funlight 135, and display light source 145 are separate light sources, which selectively illuminate the respective components (keypad 120 and display 140) when electrical power is supplied to the particular light source by the power management circuit 150. Further, the intensity of the illumination by each of the light sources is dependent on the amount (or level) of electrical power supplied by the power management circuit 150. Power management circuit 15.0 includes switching mechanism (described below), which enables power management circuit 150 to selectively drive the illumination light source with (1) power levels optimized for illuminating the particular display (or keypad) or (2) power level modulation, which generates optically modulated light that is indicative or representative of a data stream generated from the data processor IC 105.

Different from electronic device 100 (FIG. 1), electronic device 200 (FIG. 2) comprises self illuminating display 245, rather than a display (140) and separate display light source (145) as provided with electronic device 100 (FIG. 1). Self illuminating display 245 are emissive displays in which every display pixel emits light and can be controlled to turn on and off to form desired graphical patterns. Examples of self-illuminating displays include Organic Light Emitting Diode (OLED) display, Nano-emissive display (NED), or plasma display. Self illuminating display 245 is connected to power management circuit 150 via display driver IC 240, which is a part of power management circuit 150. Power management circuit 150 controls the amount of electrical power supplied to self illuminating display 245 via display driver IC 240, when the electrical power is supplied, as well as the length/duration of time the electrical power is supplied.

As illustrated, electronic device 100/200 further comprises optical receiver 170 by which electronic device 100/200 receives light, which has been modulated to include optically-transmitted data. Optical receiver 170 is a photo detector, which typically includes a photodiode, amplifier, demodulator and optics. The optical receiver 170, in conjunction with the microprocessor and the data modulator/demodulator 180, enables completion of demodulation functions, including: (1) receiving light that includes optically-transmitted data; and (2) demodulating the received light to extract the transmitted data; and (3) removing noise from optical or electrical sources. As described in greater detail below, the light that includes the optically-transmitted data is received from another (external) device, which may be similarly configured to electronic device 100/200 and which together with electronic device 100/200 establishes an optical communication data link.

The various input and output devices allow for user interfacing with electronic device 100/200. In addition to the above components, electronic device 100 may also include other components utilized to enable standard voice or form of data communication from/to electronic device 100/200. These other components are depicted with dashed lines, as they are not required to complete the functions of the invention. Among these components is transceiver 171, which is connected to antenna 175 to enable communication of radio frequency (RF) signals from and to electronic device 100/200. When electronic device 100/200 is a cellular phone, some of the received RF signals may be converted into audio which is outputted via speaker 127 during an ongoing voice communication. Further, electronic device 100/200 may be a global system for mobile communication (GSM) phone and thus includes a Subscriber Identity Module (SIM) card 160, which connects to processor IC 105 via a SIM adapter/port (not shown). SIM card 160 may be utilized as a storage device for storing data that is eventually transmitted as optically-transmitted data using the features of the invention as described herein. The data may also be stored within memory 110.

In addition to the above hardware components, several functions of electronic device 100/200 and specific features of the invention may be as functional code that is stored within memory 110 and executed by the microprocessor (or data processor) on processor IC 105. The microprocessor executes various functional code/firmware (e.g., data modulated light transmission—DMLT—utility 190) to provide processor-level control for initiating/triggering the modulation of the light source with data and transmission/projection of the modulated light, as described in greater details below. DMLT utility 190 may include therein code for implementing data modulator/demodulator 180, when data modulator/demodulator 180 is a software construct. Additionally, in one embodiment, DMLT utility 190 also provides the following functions, among others: (1) displaying within menu options of the electronic device a specific option that triggers the activation of the optical modulation features of the electronic device 100/200; (2) receiving a user selection of the specific menu option and responding by signaling the data processor to (1) provide the data stream to the data modulator/demodulator 180 and (2) trigger the switching mechanism of the power management circuit 150 to change operational modes to a data communication mode; and (3) providing/identifying selected data for the generation of optically-transmitted data. DMLT utility 190 may also assist in authentication or authorization process prior to data communication via optical communication link. These functions and others represent the method processes of the invention.

When a user of the electronic device desires to transfer data via the illumination light source, the user first activates the data transfer function via a software or hardware trigger. In one embodiment, activation involves accessing the feature via the menu options of the electronic device, where a function for enabling optical modulation of light to enable data transfer is provided as a selectable option within the menu offerings. In another embodiment, the electronic device is designed with an optical data transmit button. Alternatively, the electronic device may be provided the software functionality to set up an optical data transmit button by defining an existing button to automatically activate that feature when depressed. Once the activation is complete, the user selects the appropriate data to be transmitted (or the data may be pre-selected prior to activation) and brings the visible light source (e.g., display screen) of the communication device in close vicinity (at a substantially direct line of sight propagation) of the optical receiver of another device or a dedicated optical receiver. Notably, one implementation restricts the data transmitting features to only authenticated users of the portable electronic device. Thus, a security feature is added to the device to prompt the user for prior authentication (e.g., a password entry) before data is allowed to be optically transmitted from the portable electronic device. An authentication procedure is provided with pre-established authentication parameters required to be entered prior to switching the device to data transmission mode. In one embodiment, another security features that is added to the device includes requiring the electronic device to receive an authentication confirmation from an external device using the optical data link before data is allowed to be optically transmitted from the electronic device. Methods of authentication include the use of passcodes and the use of biometric sensing functions, among others.

Those of ordinary skill in the art will appreciate that the hardware depicted in FIGS. 1/2 may vary depending on implementation. Other internal hardware or peripheral devices may be used in addition to or in place of the hardware depicted in FIGS. 1 and 2. Also, the processes of the present invention may be applied to any portable/handheld electronic device or data processing system or similar device with a light source that may be modulated by a power management circuit. Thus, the depicted example is not meant to imply architectural limitations with respect to the present invention.

Figure 5:
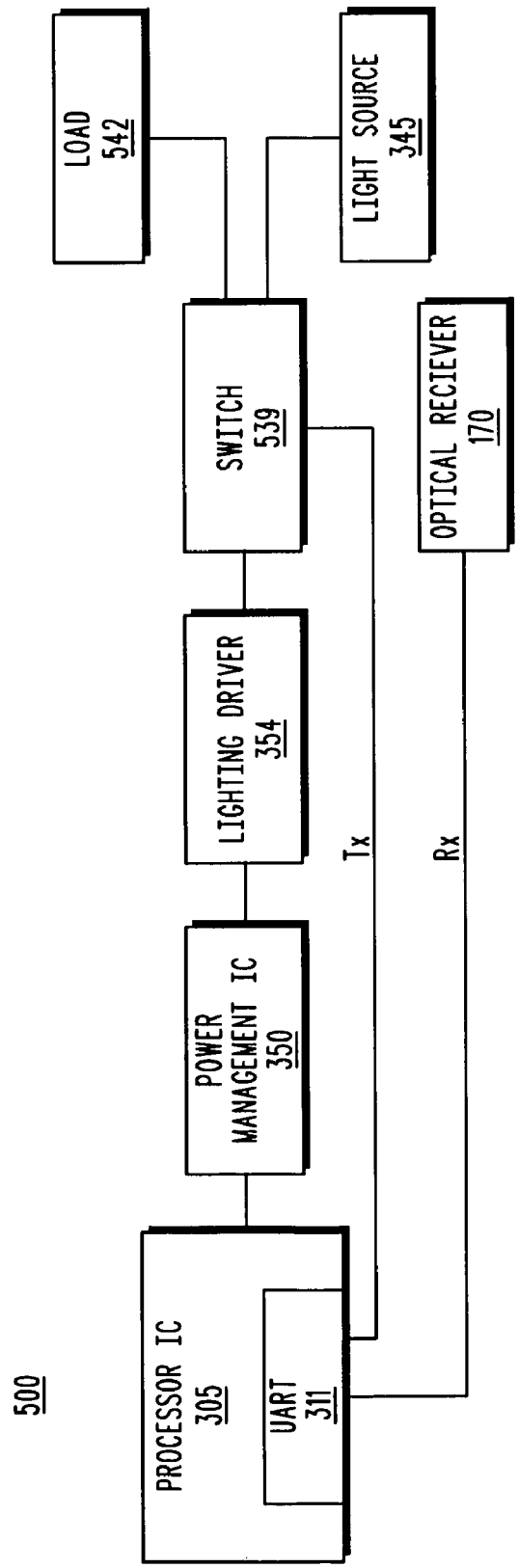
FIGS. 5 and 6 provide block diagram representations of two alternative driver configurations by which optically-transmitted data may be generated for transmission, in accordance with embodiments of the invention.
Figure 6:
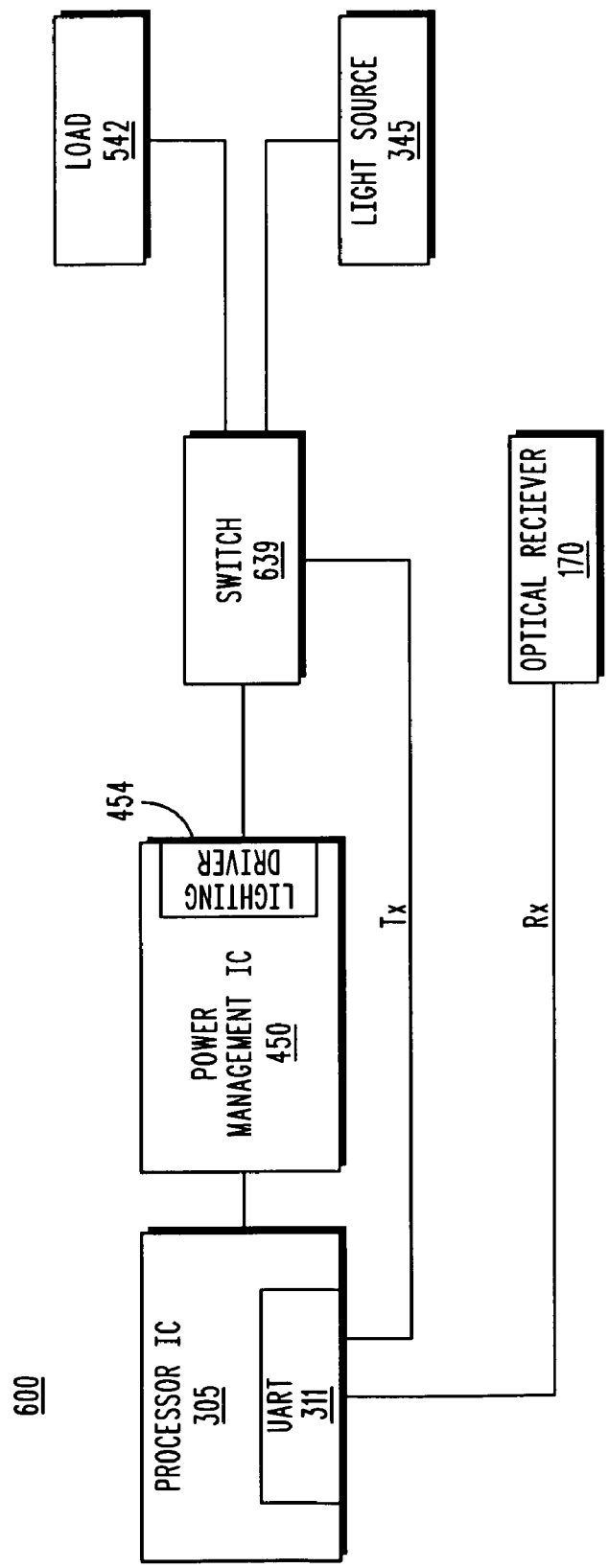

According to the described embodiments of the invention, the power management circuit 150 is expected to be able to switch at relatively high frequencies (e.g., 500 kHz or 1 Mbps—megabits per second—data rate) than the frequencies commonly used for pulse width modulation (PWM) of light sources to enable the transfer of data files between electronic devices. Several different driver options are provided to support/enable this high frequency switching requirement, which is not supported by conventional device configurations. These driver options are illustrated by FIGS. 3 through 6, with FIGS. 3 and 4 depicting embodiments with the light source driver providing the switching frequency, and FIGS. 5 and 6 depicting embodiments with a separate switch mechanism and a connected load.

FIGS. 3 and 4 illustrate two different driver configurations of a light source, such as the example light sources (125, 135, 145, 245) of FIGS. 1 and 2, according to embodiments of the invention. As depicted, each driver configuration 300/400 comprises an interconnection between processor IC 305 and respective power management ICs 350/450. In both configurations, in a specific embodiment, processor IC 305 also includes universal asynchronous receiver/transmitter (UART) 311. In driver configuration 300 (FIG. 3), a separate lighting driver IC 354 is provided, which is coupled to power management IC 350 and to light source 345. Separate lighting driver 354 includes therein a second UART 313, which is operationally coupled to UART 311 via a data transmission (Tx) line. Separate lighting driver 354 controls the application of power to light source 345.

In driver configuration 400 (FIG. 4), lighting driver 454 is a component of (or embedded within) power management IC 450 and controls application of power to light source 345. Further, second UART 415 is also included within power management IC 450. In addition to the above components of driver configurations (300/400), each driver configuration 300/400 also comprises optical receiver 170, which is coupled to UART 311 via a receiving (Rx) signal line.

The lighting drivers 354 and 454 are designed to be able to switch the light source between an illumination state/mode and a communication state/mode. Switching is activated by the data processor triggering the power management IC 350/450 to activate the new communication state. In one embodiment, further enhancements to the driver configurations enable the switching and other power control features of the invention.

In one embodiment, a switch mechanism is provided within (or associated with) power management module 350/450. The switch mechanism maybe set in one of two states (e.g., on state and off state, or a 1 or 0 bit state when represented by a processor-settable bit). These two states may represent when the display/keypad 140/120 and light source 145/125 are being utilized in illumination mode and data transmission mode, respectively. The microprocessor triggers the switch mechanism by sending a signal to power management IC 350/450, which signal sets the switch mechanism and indicates to light source driver 354/454 a specific state (or operational mode) in which the light source 125/145 of the electronic device is to operate in. In another embodiment, the microprocessor triggers the switch mechanism by sending a signal to power management IC 350/450 and to a display driver IC (not depicted), which signal sets the switch mechanism and indicates the mode that display mechanism (e.g., display 140 and display light source 145) of the electronic device is to operating in. When in communication mode, the display itself assists with enabling the communication mode by displaying a monochrome screen, other graphical patterns, or displaying communication user interface or a communication status report.

FIGS. 5 and 6 illustrate alternative driver configurations with a separate switch mechanism and load. As shown, driver configurations 500/600 comprises processor IC 305 interconnected to respective power management IC 350/450. Processor ICs 305 include UART 311. Driver configurations 500/600 comprise a switch mechanism 539/639, which can be a field effect transistor (FET), which is coupled at its output to both light source 345 and an additional load 542. In driver configuration 500 (FIG. 5), switch 539 is coupled to separate lighting driver 354. In driver configuration 600 (FIG. 6), switch 639 is coupled to lighting driver 454, which is embedded within (or a component of) power management IC 450. In both configurations, switch 539/639 receives switching signals from processor IC 305.

As with FIG. 3, driver configuration 500 of FIG. 5 comprises a separate lighting driver 354. However, within driver configuration 500, separate lighting driver 354 is coupled between power management IC 350 and switch 539. Separate lighting driver 354 controls the application of power from power management IC 350 to display light source 345 (and load 542) via switch 539. In driver configuration 600 of FIG. 6, lighting driver 454 is provided within power management module 450 and (embedded) lighting driver 454 controls application of power to light source 345 (and load 542) via switch 639. As with driver configurations 300/400 of FIG. 3 and 4, driver configurations 500/600 further comprise optical receiver 170, which is coupled to UART 311 within respective processor IC 305.

During operation, the power management circuit 150 (which may comprise power management IC 350/450, lighting driver 354/454, and in one embodiment switch 539/639) receives a data stream from the data processor (305), switches the light source 345 to a communication mode, and then modulates the light source to convert the data into optically modulated signals that are then emitted as optically-transmitted data from the electronic device (e.g., device 100/200 of FIGS. 1 and 2). Modulation of the light source may be supported by data modulator/demodulator 180. As one example, when modulating an LED light source with binary data, the data modulator/demodulator 180 signals the power management module 150 to modulate the individual LEDs, such that LED on=1 and LED off=0 or vice versa. In one embodiment, one or more of the light source(s) is modulated at a predetermined frequency (e.g., 212 KHz) to generate light signals representing optically-transmitted data that is emitted/transmitted from the electronic device (100/200).

During the data transmission mode, the power management circuit 150 switches the lighting mode of the light source 345 from the illumination mode, which has first illuminating characteristics, to a data transmitting mode, which has second illuminating characteristics. The second illumination characteristics support modulation of the light source 345 and enables generation and transfer of the optically-transmitted data. In one embodiment, the second illumination characteristics includes, but is not limited to, one or more of: (a) increased power to specific individual components (e.g., LEDs) of the light source 345; (b) changing a color of light provided by the light source 345 to a pre-selected color that supports a desired transmission frequency; and (c) directing projected light at an angle that is a pre-determined number of degrees relative to a surface layer of the display device to enable maximum transmission of the optically-transmitted data in a pre-determined direction.

Figure 7:
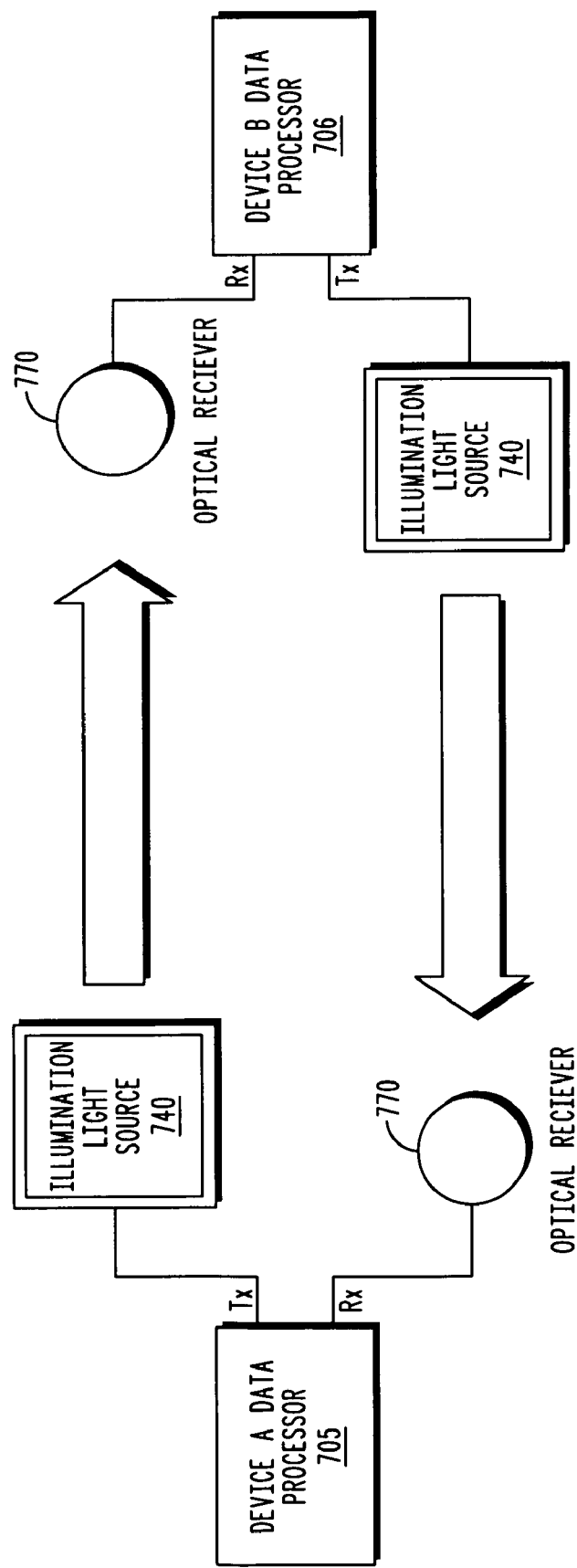
FIG. 7 is a schematic diagram illustrating transmission and reception of optically-transmitted data using illumination light sources and optical receivers, respectively, in two device data communication exchange, in accordance with one embodiment of the invention.

Turning now to FIG. 7, which provides a schematic diagram illustrating the exchange of optical data communication between two devices (device A and device B) using the illumination light sources and optical receivers to transmit and receive optically-transmitted data (generated by modulating the light source). Device A processor 705 provides the data to modulate the light source 740 during data transmission (Tx). The modulated light emanates/travels from light source 740 of device A, and the light is detected/received by optical receiver 770 of the second device (Device B) during reception (Rx). The received modulated light is "demodulated" (i.e., the data is extracted), and the demodulated (extracted) data is then forwarded to the Device B processor 706, as received data. Data transmission from Device B to Device A occurs via a similar process, wherein modulated light is transmitted from light source 740 (of Device B) and received by optical receiver 770 of Device A. Light source 740 is illumination light source for display, keypad or is the emissive display or funlight of device A/B.

The transmission and reception of modulated light, as illustrated by FIG. 7, enables one or more channels of data transmission. That is, a single color (or wavelength) of light may be identified (or pre-specified) to support the optical modulating features of the invention or multiple colors (or wavelengths) may be utilized. In one embodiment, a color filter can be used to remove wavelength components with the longer rise and fall times and allowing the wavelength with the shortest rise and fall time to pass and to be emitted/transmitted for optical communication function. This application of a color filter substantially improves the overall bandwidth of optical data transmission. In another embodiment, different color LEDs (or OLEDs) are provided within the light source, and the power management circuit 150 is able to individually apply (and modulate) power to the different color component sources. In one embodiment, when the electronic display light source is used for data transmission, the electronic display displays a monochrome pattern during the data transmission mode, and the monochrome pattern is spatially or temporally changed according to the spectrum of the illumination light source that is modulated.

In another embodiment, given that the light source comprises at least two wavelengths in visible spectrum, multiple wavelengths may be modulated independently to carry a separate data stream of optically-transmitted data. Thus, with each wavelength associated with different colors in the spectrum having different transmission frequencies, each wavelength is utilized as a separate transmission channel. In this embodiment, the power management module comprises a mechanism for separately assigning a different data stream of optically-transmitted data to two or more different color lights with different wavelengths and frequencies. An example of the implementation of multiple, concurrent transmission channels is illustrated by FIG. 8, which is now described.

Figure 8:
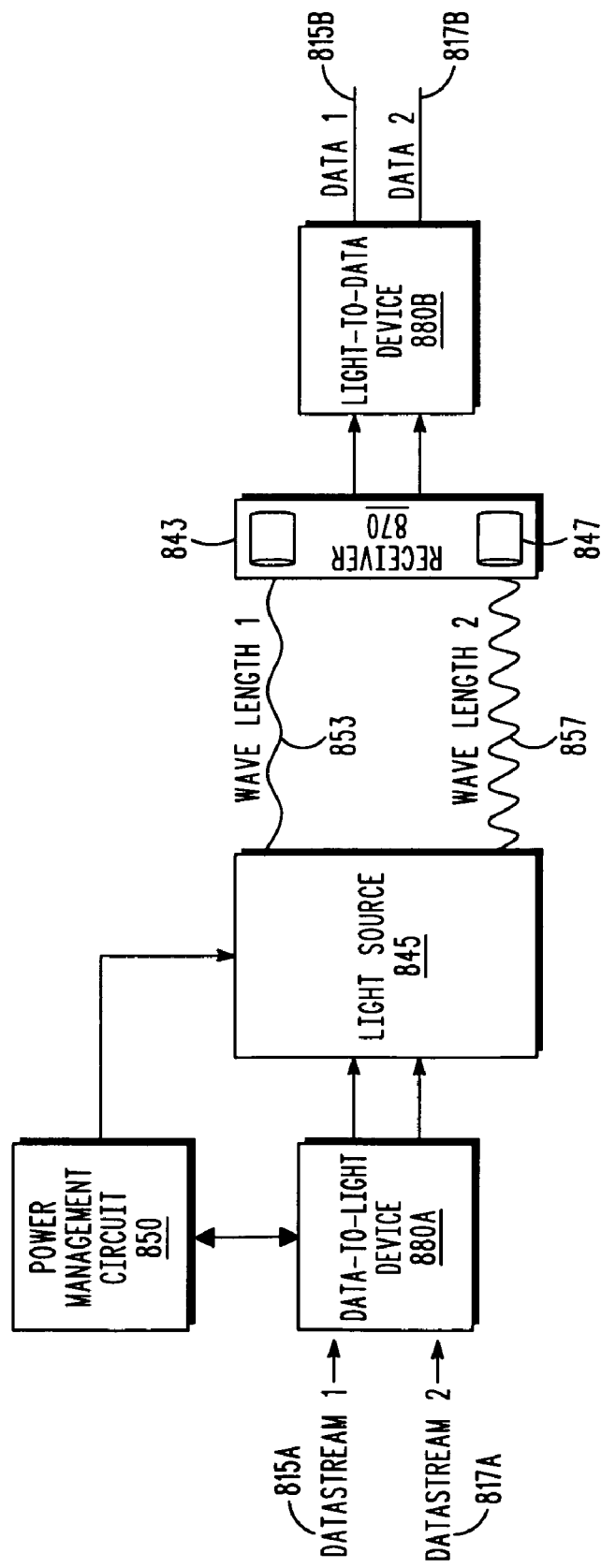
FIG. 8 illustrates a multiple wavelength implementation by which one or more optically-transmitted data streams are concurrently communicated from the light source of an electronic device to respective optical receivers, at different wavelengths/frequencies, according to one embodiment of the invention.

In FIG. 8, two data streams 815A, 817A are concurrently generated at data processor (not shown) and passed through data-to-light modulation device 880A (e.g., data modulator/demodulator 180 of FIGS. 1 and 2 and driver mechanisms described earlier). The modulation device 880A is coupled to power management circuit 850, which is in turn electrically coupled to light source 845. Light source 845 is modulated by power management circuit 850 to generate two channels of optically-transmitted data, namely channel 1 853 and channel 2 857, which respectively correspond to data stream 1 815A and data stream 2 817A. Each channel (853, 857) transmits optically-transmitted data via respective wavelengths (having different characteristics).

Both wavelengths are received at optical receiver 870, which includes sub-receivers 843 and 847, which each detect and receive specific ones of the two wavelengths of modulated light. Sub-receivers 843/847 forward the received optically-transmitted data to light-to-data modulation device 880B (e.g., a second data modulator/demodulator 180 and receiver devices), which demodulates the light to re-generate the data streams as received data streams 815B, 817B. With the present embodiments in which multiple primary colors (and/or wavelengths) are utilized to enable concurrent channels of data transmission, the overall bandwidth for data transmission is increased. Notably, the number of optical data channels may be increased up to a point at which bandwidth and/or performance begins to degrade.

Notably, with the above multiple concurrent channel transmission, the optical receiver 870 receives each of the wavelengths of optically-transmitted data via a separate sub-receiver. However, in one embodiment, a single optical receiver is provided and additional processing logic is then utilized to separate out the different data streams by identifying and de-convoluting the different data carried by two wavelengths via available de-convolution techniques. Alternatively, in one embodiment, the optical receiver 870 may be tuned to receive optically-transmitted data on only a specific channel, and the optical receiver 870 would thus filter out one (or both) of the optically-transmitted data received based on the wavelengths on which the data is transmitted. Thus, the optical receiver 870 filters out the other channels (e.g., by blocking all unsupported wavelengths) prior to forwarding the received optically-transmitted data to the modulation device 880B. By removing the other channels from the communication, the optical receiver 870 substantially improves the communication bandwidth for the supported channel(s), or enables a secure or private communication channel between two electronic devices.

In one embodiment, design of the optical receiver (170 of FIGS. 1 and 2) involves utilization of a fast response photo sensing device (e.g., Si PIN diode), which allows for a high data rate communication. An integrated circuit (IC) device may be selected, which integrates a photodiode and amplification circuits and which outputs digital logic levels. In one embodiment, the receiver IC is packaged with ambient light sensors, which determine ambient light levels and provide feedback to power management circuits to optimize optical data communication function and to reduce device power consumption. In order to increase the distance from which the data transmission may occur, one embodiment of the invention utilizes passive optical elements (e.g., a Fresnel lens) to enable light collection. The characteristics of the optical element, for example, the diameter or refractive index of the lens, determines its light collection ability and hence the distance from which optical data communication may occur.

Figure 9:
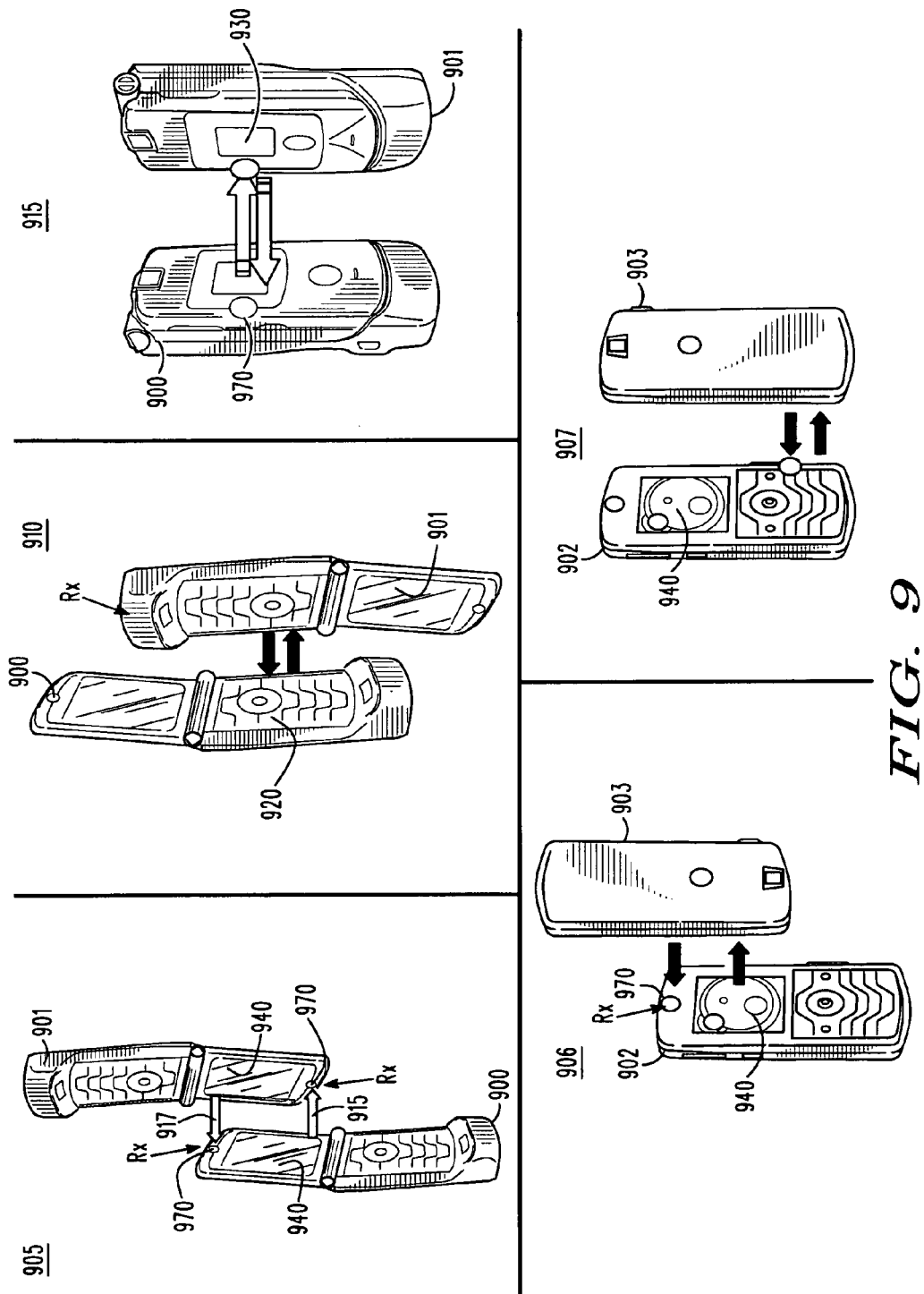
FIG. 9 provides a series of pictorial images of two portable electronic devices exchanging/communicating optically-transmitted data with each other using a light source for data transmission and an optical receiver for data reception, in accordance with embodiments of the invention.

FIG. 9 provides a series of pictorial images of two portable electronic devices exchanging/communicating data with each other using respective light sources and optical receivers for data transmission, in accordance with embodiments of the invention. This first (primary) usage scenario enables device-to-device data transmission/communication. In the illustrative embodiments, optical receiver 970 is provided on the exterior face of the portable electronic device 900 and 901. Different embodiments of the invention may be provided in which the optical receiver 970 is placed at different locations within the electronic device (900/901). The optical receiver 970 may consist of a single photodiode in a dedicated location. In another embodiment, multiple photodiodes are provided, distributed at various locations on the surface of the electronic device. In one implementation, the optical receiver 970 is integrated within the display assembly. With this implementation, the optical receiver 970 may be integrated on the display border or packaged with the backlight LEDs, for example. When packaged with the backlight LEDs, a special backlight guide may be provided. In yet another embodiment, the optical receiver 970 may be built in the display TFT plane of the electronic device.

As further shown by FIG. 9, a two-way optical data channel (channels 915, 917) is completed using a line of sight between two electronic devices (depicted as cellular phones) with optical receivers 970. The position of the optical receiver 970 and the light source on the respective devices may dictate the orientation of the devices relative to each other when completing the data communication. Each pairing of phone devices may be considered a different embodiment as the pairings each involve different configurations of the optical receiver 970 relative to light source. Additionally, the top three configurations (905, 910, and 915) illustrate use of three different light sources, namely light sources for display 940, keypad 920, and caller ID display 930.

In the first three configurations 905, 910, and 915, cellular phones 900 and 901 are flip phones, with a display 940 and keypad 920 provided when the phones are in the "open" position, and a caller ID display 930 in the front casing when the phone is in the "closed" position. In the bottom two configurations 906 and 907, cellular phones 902 and 903 are standard (non-flip) phones with the display and keypad visible on the front of the phone device.

In the first configuration 905, each cellular phone 900 and 901 transmits optically-transmitted data via display 940 and receives optically-transmitted data from the opposing display (940) via optical receiver 970. Similarly in the third configuration 915, each cellular phone 900 and 901 transmits optically-transmitted data via CLI display 930 and receives optically-transmitted data from the opposing CLI display (930) via optical receiver 970. However, in the second configuration 910, cellular phones 900 and 901 transmit the optically-transmitted data via a keypad light source (not shown), and the optically-transmitted data emanates from keypad 920.

In several of the configurations, data transmission channels 915 and 917 are shown as directional arrows from the display 940 of respective cellular phones (900/901) to the opposite optical receiver 970. From the perspective of the primary cellular phone 900, optically-transmitted data is transmitted via transmission channel 915, while modulated light is received on receiving channel 917. Implementation of the invention thus enables peer-to-peer data transfer without utilizing other short range communication mechanisms such as IrDA or Bluetooth.

FIGS. 9-13 illustrate several example embodiments of the creation of an optical communication link, which may be bi-directional, between a first portable electronic device (e.g. a cellular phone) and a second electronic device/mechanism. With the embodiments of FIGS. 9 (described above) and 10, the second electronic device is a similar device as the first and performs basic device-to-device communication. For each other embodiment (FIGS. 11-14), the second electronic device/mechanism performs a primary (or secondary) function following receipt of data via optical pulses generated by the illumination light source of the first electronic device.

In the various functional application scenarios (i.e., the embodiments illustrated by the various figures), an optical data communication system is established by a first portable electronic device, designed with functionality for optical data transmission, as described herein, and a second device. The first electronic device includes: (1) a data processor for generating data for communicating with an external device; and (2) an illumination light source for illuminating a component of the first electronic device and for selectively transmitting data via optical pulses. Additionally, the first device includes data transmission logic for: (a) providing a data transfer interface that supports processing of selected data by the processor; (b) switching the illumination light source from an illumination mode to a data communication mode; and (c) transmitting data from the electronic device by encoding the data in optical pulses generated with the illumination light source.

To enable bi-directional communication/data exchange, the first electronic device also comprises an optical receiver which is operable as a receiver (for optically-transmitted data) within an optical communication data link. The optical receiver has associated logic for responding to the receipt of optically transmitted data by: (a) extracting the data from the light input; and (b) enabling processing of the data by the processor. The optical receiver may be a built-in optical receiver and/or a separate optical receiver that is communicatively tethered to the first device.

The communication between the first and second devices is completed via a bi-directional duplex communication link, created with a second optical receiver and an optical data transmission mechanism of the second electronic device. Within this link, at least the first electronic device is equipped with a dual function optical transmitter (i.e., a light source that is utilized for both illumination and data communication). The second device may also be configured with a dual function transmitter or may alternatively have a dedicated transmitter. For each described embodiment, the first device is placed/held within the optical range of the second device's optical receiver (i.e., the range at which the second device's receiver can accurately receive the optical pulses containing data from the first device).

The first device may be one of (a) a cell phone, (b) a PDA, (c) a personal multimedia player (PMP), (d) a MP3 player, or some other portable electronic device. Also, the second device may include a built-in optical receiver and/or a separate optical receiver that is communicatively tethered to the second device. The first device comprises logic for enabling sharing of portions of data contained within the first device and/or the second device by contemporaneously transmitting data encoded within optical pulses between the first electronic device and the receiver of the second device and vice versa.

Figure 10:
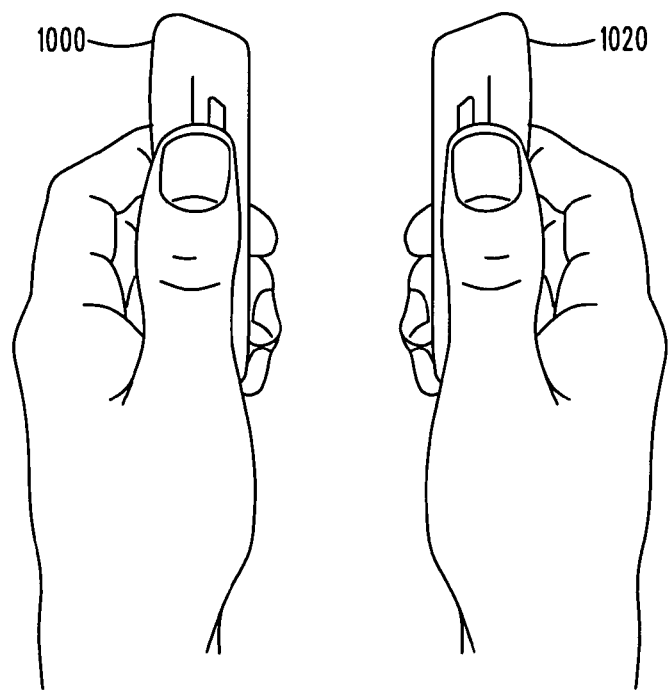
FIGS. 10-13 illustrate different methods of communicating between a first electronic device designed according to the invention and a second device that is equipped with at least an optical receiver to enable transmission of specific information from the first device and the second device, according to embodiments of the invention.
Figure 11:
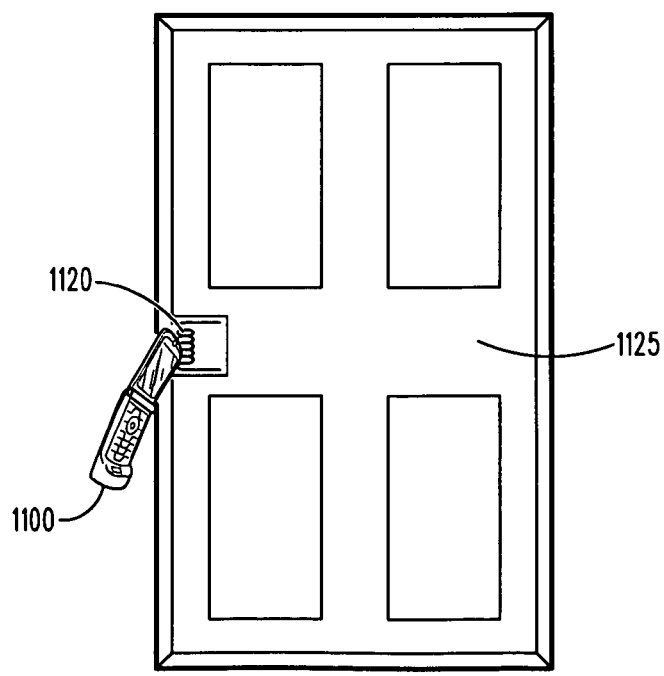
Figure 12:
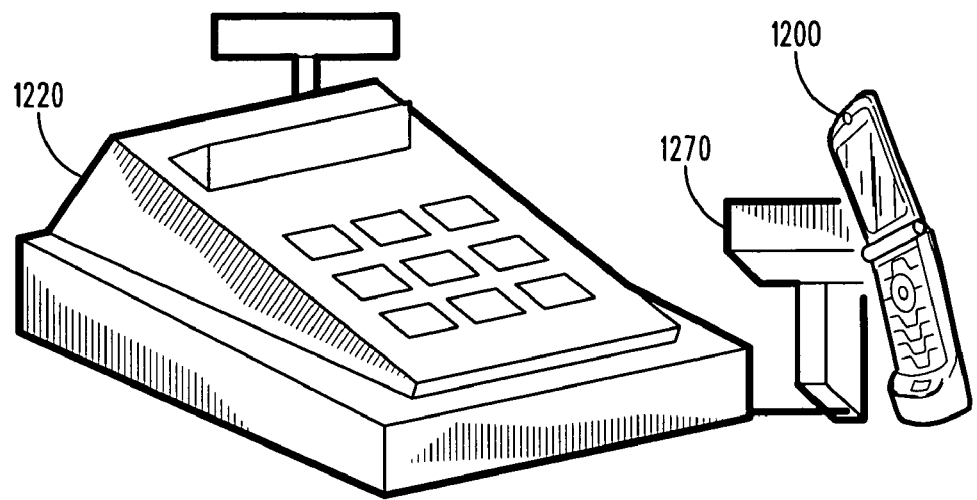
Figure 13:
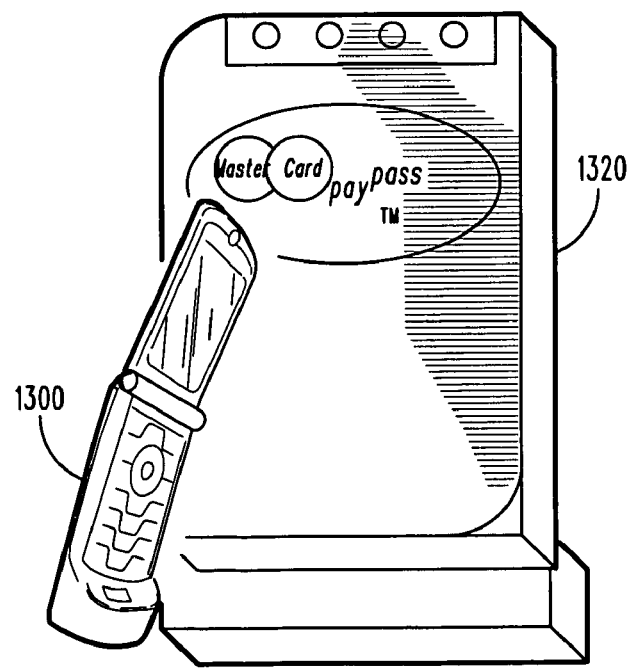

As shown by FIG. 10, two similarly configured electronic devices, first electronic device 1000 and second electronic device 1020, may be utilized to establish a bi-directional data communication (or information exchange) optical link. Additionally, the above described configuration and design of a portable electronic device (such as the cellular phones of FIG. 9) with the functionality which provides optical data communication with a second device is further enhanced to support/enable a plurality of other functional applications. Generally, these functional applications involve the exchange/communication of information (or data) between the first portable electronic device and the second device. The second device is one that is designed to perform a particular function in response to receipt of certain information (or data) via received optical pulses. FIGS. 11-13 illustrate specific ones of these applications, which are described below.

In one embodiment, transmitting the data from the first electronic device activates one or more preset functions, which functions may include first initiating/establishing the communication link. Also in one embodiment, when an error in transmission is detected in the received data, the receiving device (e.g., the first electronic device) automatically requests a retransmission of at least a portion of the data that was transmitted (i.e., the portion containing the error) via the communication link. Thus, according to this embodiment, faulty communication is corrected by re-transmission of the data. Also, in one embodiment, the first electronic device may include logic that issues a confirmation message to indicate the completion of data transmission.

In other embodiments, the first electronic device farther comprises logic for: (a) transmitting, on the optical communication link, a request for authentication data from a second device; (b) comparing the authentication data received in response against a pre-established authentication parameter that is required to establish the optical communication link. The authentication data may be one or more of (a) a password, (b) a biometric sensor input, and (c) an electronic token. Entry of an electronic token may be required for certain media files that may require DRM. In these cases, a pre-arranged token is then established to consume the data. Following the authentication, the first device enables transmission of content data (i.e., data that is not authentication data) from the first device to the second device. Accordingly, the content data is only transmitted after authentication of the second device.

In a related embodiment, the first electronic device comprises logic for requesting entry of an authentication data in the first device prior to enabling the first device to transmit data to a second device. The entered authentication data is then compared against a pre-established authentication parameter that is required for the first device to transmit data to the second device. Thus, transmission of data from the first device to the second device is only enabled after correct authentication at the first electronic device.

In another related embodiment, the first electronic device comprises logic for providing an authentication data to the second electronic device upon request by the second electronic device prior to enabling the first device to transmit data to a second device. The entered authentication data is then compared against a pre-established authentication parameter that is required for the first device to transmit data to the second device. Thus, transmission of data from the first device to the second device is only enabled after correct authentication of the first electronic device by the second electronic device.

Turning now to FIGS. 11-13, which illustrate the embodiments in which additional functionality is enabled using specific types of second devices. FIG. 11 illustrates one embodiment in which the features of the invention provide an optically-transmitted security code which unlocks an electronic locking mechanism 1120 of a door/gate 1125. With the FIG. 11 embodiment, the optical data communication system is utilized to enable the first electronic device 1100 to serve as a "key" for unlocking the electronic locking mechanism 1120. Accordingly, the first electronic device 1100 includes an unlocking code (stored as data) for unlocking electronic locking mechanism 1120. The electronic locking mechanism 1120 represents the second device, and unlocks when a preset unlocking code is received as data encoded within optical pulses of light. Electronic locking mechanism 1120 includes an optical receiver and unlocking logic (not shown). The portable electronic device 1100 is utilized to transmit unlocking authorization data (via optical pulses) required to gain entry to secure locations (via gate/door 1125). When the correct code is transmitted via the optical pulse from the first device 1100 to the optical receiver of the electronic locking mechanism 1120, the electronic locking mechanism 1120 unlocks to provide access to the locked component. In one embodiment, a user authentication data may be required to be entered in device 1100 before the unlocking code can be transferred from device 1100 to electronic locking mechanism 1120.

FIG. 12 illustrates the embodiment in which the optical data communication system is utilized to enable electronic payment using the first electronic device. The first electronic device 1200 stores/maintains data related to a payment method or mechanisms for providing electronic payment. For example, the data may contain a credit card number or bank account information, or PayPal™ information, or simply billing information (name and "billed to" address). Also, the data/payment information may also be a financial institution routing number with account number, a debit card number, personal identification information including addressing information for forwarding a request for payment, and reference information for a pre-charged credit account that is automatically debited. An electronic transaction mechanism (1220) represents the second device, and is designed to accept the specific payment information as data encoded within an optical pulse received from an illuminating source of the first device 1200. In one embodiment, a user authentication data may be required to be entered in device 1200 before the transaction data can be transferred from device 1200 to electronic transaction mechanism 1220.

As shown by FIG. 12, the features of the invention enable remote payment transaction for commercial or other transactions (e.g., use of the first device as an electronic wallet or credit card). In the illustrative embodiment, the portable electronic device 1200 is utilized to provide payment at a cash register 1220, equipped with an optical receiver 1270. Similar features may be provided in a next embodiment in which the features are applied to provide payment at a paypass station 1320, which is also equipped with an optical receiver (not shown). This latter embodiment is illustrated by FIG. 13.

Figure 14:
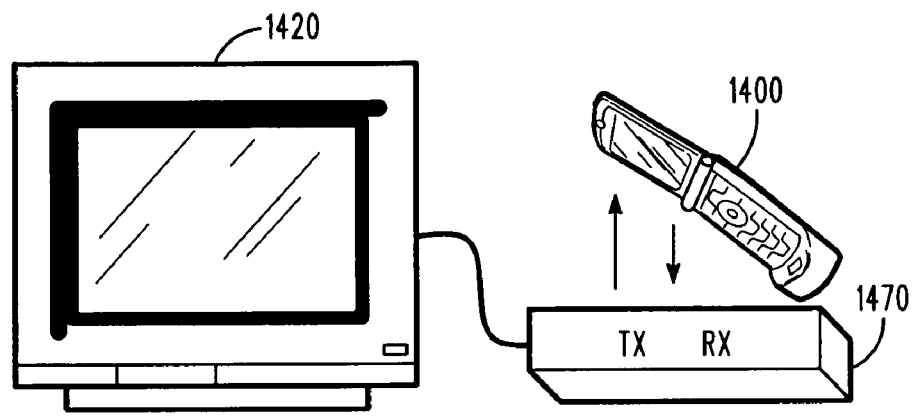
FIGS. 14-15 illustrate the use of a separate optical receiver/transceiver to communicate with a secondary electronic device to which the transceiver is tethered, in accordance with embodiments of the invention.
Figure 15:
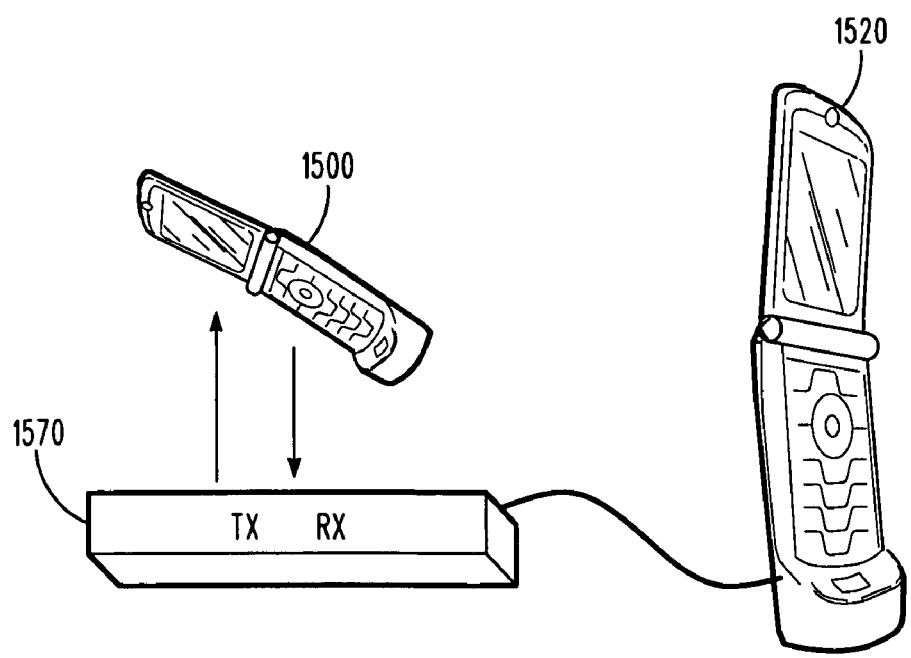

FIGS. 14 and 15 illustrate embodiments in which a separate optical transceiver device 1470/1570 is provided and utilized to complete the communication link with a secondary device 1420/1520. In FIG. 14, the optical transceiver device 1470 is tethered via a communications link to the computer device 1420. In one embodiment, the optical transceiver device 1470 is coupled to computer device 1420 via a serial data connection (e.g., USB—universal serial bus). The optical transceiver device 1470 includes an optical receiver and, in one embodiment, an LED or other light source, which is utilized as the optical transmitter. In another embodiment, the optical transceiver device 1470 includes electronic circuits and ICs that performs signal amplification, filtration, and data interface functions. The illumination light source emanating the encoded data from the first electronic device 1400 is placed in proximity to the optical receiver of the optical transceiver device 1470. The first electronic device 1400 transmits and receives data to and from computer device 1420 via the optical transceiver device 1470. In one embodiment, the optical transceiver device 1470 provides "docking station" functionality for the first electronic device 1400, and is designed with a surface on which the dual function light source of the first electronic device 1400 is placed during data communication. In another embodiment, the optical transceiver device 1470 is designed as a dongle attached to device 1420. With the above configurations, the features of the invention enable transfer of data and/or synchronization with computer device 1420.

As shown by FIG. 15, one embodiment provides an optical transceiver device 1570 that couples to a second electronic device 1520 to allow optical data communication from the first electronic device 1500 to another electronic device 1520. The second electronic device 1520 may not be equipped with the capabilities to modulate its light source(s). Where the second electronic device is a cellular phone, the optical transceiver device 1570 may be connected via the data communication port (and/or power port) of the other cellular phone (1520).

Figure 16:
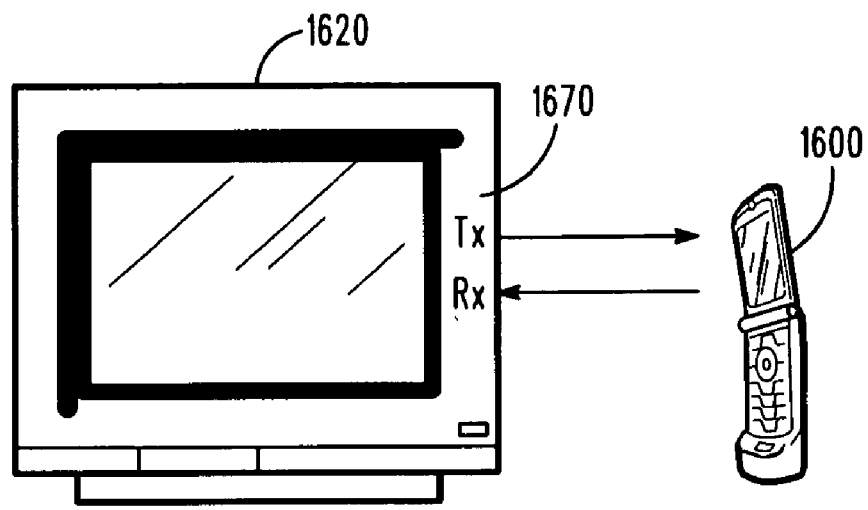
FIGS. 16-18 illustrate additional applications of the optical data transmission capability of a portable electronic device to enable a communication channel for information exchange and/or synchronization with a second electronic device, in accordance with embodiments of the invention.
Figure 17:
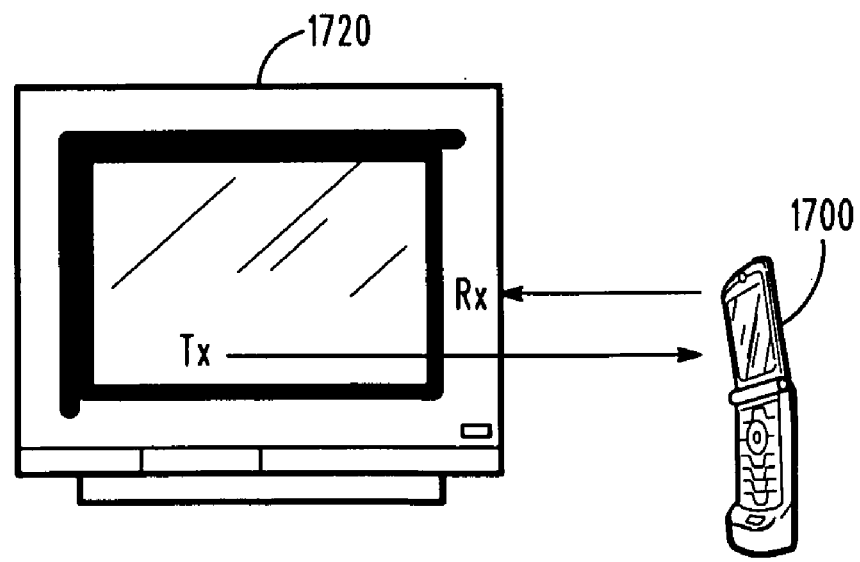
Figure 18:
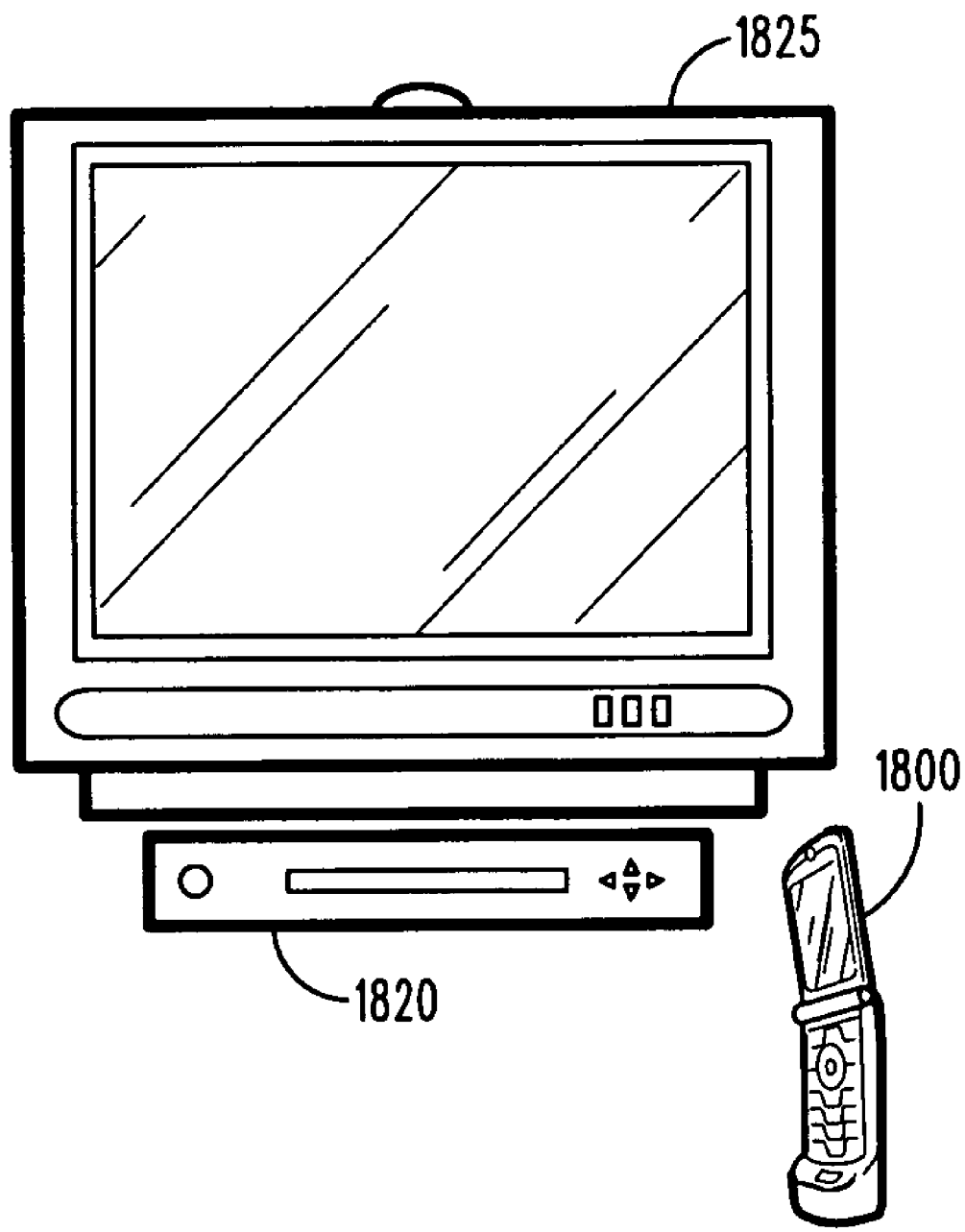

With reference now to FIGS. 16-18, there are illustrated additional embodiments in which the features of the invention enable device-to-computer synchronization and/or communication (or exchange) of information/data. Three different designs or configurations of the computer device 1620 that enable exchange of optically-transmitted data with first electronic device 1600 are provided by FIGS. 16-18. As shown by FIG. 16, computer device (or monitor) 1620 comprises dedicated optical transmitter/receiver 1670 embedded within the external casing of device monitor 1620. In one embodiment, computer monitor 1620 includes an optical transceiver area within the external computer casing.

With FIG. 17, the display unit of device monitor 1720 is utilized as the optical transmitter, using similar technology as provided herein. Accordingly, the light source of the display of computer monitor 1720 may be modulated similarly to the light source of the first electronic device 1700 to enable transmission of optically-transmitted data (generated by the computer's processor), where the data is transmitted using the computer monitor.

FIG. 18 illustrates the embodiment in which the optical data communication system is utilized to enable control of an electronic content storage device, such as a digital video recorder (DVR) 1820. The first device is then provided as a control device 1800, wherein the DVR 1820 and control device 1800 both have an associated optical receiver. The control device 1800 comprises logic for transmitting control data via optical pulses to the DVR 1820, which enables the digital content to be shared and viewed on the first electronic device (1800) or on a video monitor (or television) 1825 associated with DVR 1820. Communication from DVR 1820 to control device 1800 may be via a dedicated LED or laser diode on the DVR.

In one embodiment, when a request for activation of a duplex communication link is received at the first device, the logic of the first device responds by: (a) generating a response data from a processor of the first device; (b) initiating a communication interface on the processor for data transmission (which enables the interface to initiate and set transmission parameters, such as speed); (c) switching the light source of the first device from an illumination mode to a communication mode; (d) dynamically activating a first power level optimized for completing the modulating of the light source; and (e) modulating the light source to produce modulated optical signals indicative of the response data generated from the processor.

The described embodiments of the present invention provide a method, system, and communication device that enables secure data transmission via modulation of the light source of an electronic device, such as electronic device 100/200 of FIGS. 1 and 2. The described embodiments capitalize on the availability within many existing portable electronic devices of components with a modifiable light source. In one embodiment, the light source may comprise a large number of individually controllable sub-sources, whose characteristics (e.g., intensity, length and time of light output) may be modulated by a power management circuit.

Implementation of the invention enables short distance, line of sight, wireless data transfer. One embodiment utilizes the display light source to provide an optical data link to transfer secure information between two electronic devices or between an electronic device and a dedicated reader (i.e., a device comprising a built-in optical receiver, where the device is used specifically to read optically-transmitted data generated in the manner described herein). The optical data link utilizes installed light sources and photo detectors on the electronic devices as emitters and receivers. In one embodiment, LEDs used as the display backlight are modulated at a predetermined frequency, e.g., 212 KHz, to generate the modulated light emission that comprises the optically-transmitted data.

With each application of the features of the invention, since power needs to be provided to send or receive data in an optical link, an active action is needed to start data transfer. Thus, the communication between the two communication devices (or the communication device and an optical reader as shown in FIGS. 9 to 18) is an intentional (user-directed) communication. Unwanted data transfer is minimized and security is improved compared to existing near field communication technologies. Also, with LED light sources becoming ubiquitous in the backlights of electronic devices, having these LED light sources perform a secondary data transmission function reduces the power and space demand that would be required to add additional communication components.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution.

While the invention has been particularly shown and described with reference to a preferred embodiment, it will be understood by those skilled in the art that various changes in form and detail may be made therein without departing from the spirit and scope of the invention.

What is claimed is:

1. A method of wireless data communication via an electronic device, said method comprising:

providing a data transfer interface on the electronic device, wherein the data transfer interface supports processing of selected data by a processor of the electronic device that is functionally connected to an illumination light source, which light source generates visible light that is utilized for illuminating a separate component in the electronic device and which light source is also selectively utilized for transmitting data via optical pulses while the illumination light source is in a data communication mode; and switching the illumination light source from an illumination mode to the data communication mode; and transmitting a data stream from the electronic device by encoding the data in optical pulses from said illumination light source while the illumination light source is in the data communication mode;

wherein the illumination light source is one type of light source from among different types of light sources comprising (a) a display light source for illuminating a display of the electronic device, (b) a keypad light source, which illuminates a keypad of the portable electronic device when the keypad light source is utilized for illumination, and (c) a self-illuminating, emissive type display of the electronic device;

receiving, via an optical receiver, a second data stream encoded in optical pulses, wherein the optical receiver is functionally connected to the processor;

extracting the second data stream from the optical pulses and enabling processing of the data stream by the processor;

wherein the electronic device is a first electronic device having the illumination light source and the optical receiver and wherein said transmitting of the data stream and receiving of the second data stream is provided on a bidirectional duplex communication link created with a second optical receiver and an optical data transmission mechanism of a second electronic device, wherein: the first data stream is transmitted via the optical pulses from the first electronic device and is received by the second optical receiver of the second electronic device; and the second data stream is transmitted from the second electronic device and is received by the first optical receiver of the first electronic device;
wherein said first electronic device is a portable electronic device;
transmitting said data stream via the optical pulses activates initiation of preset functions, including one or more of: initiating and establishing the communication link; requesting a retransmission of at least a portion of the data transmitted via the communication link when an error in transmission is detected in the received data stream; and confirming the completion of data transmission.

2. The method of claim 1, wherein data transmitted via the illumination light source of said first electronic device is transmitted to an optical receiver of a second device within an optical range of the illumination light source of the first electronic device.

3. The method of claim 2, wherein:
said first electronic device is a portable electronic device and said data stream includes an unlocking code for an electronic locking mechanism; and
said second device is the electronic locking mechanism, which unlocks when a preset unlocking code is received as data encoded within optical pulses of light from an illuminating source of a device that is within an optical range of the second device;
wherein said electronic locking mechanism unlocks only when the data received via the optical pulse is the preset unlocking code.

4. The method of claim 2, wherein:
said data stream is payment information for providing electronic payment; and
said second device is an electronic transaction mechanism, which accepts payment information as data encoded within an optical pulse received from an illuminating source of a device that is within an optical range of the second device;
wherein said payment information is one of a credit card number, a financial institution routing number with account number, a debit card number, personal identification information including addressing information for forwarding a request for payment, and reference information for a pre-charged credit account that is automatically debited.

5. The method of claim 1, wherein said receiving the data stream comprises receiving a data stream transmitted from a second device via optical pulses of an illumination light source of the second device.

6. The method of claim 1, wherein the type of illumination light source comprises one of: (a) a backlight of an electronic display; (b) a front light of an electronic display; (c) a backlight of an electronic keyboard; (d) a front light of an electronic keyboard; and (e) a self illuminating display.

7. The method of claim 1, wherein the optical receiver comprises one or more of (a) a photodiode, (b) a phototransistor and (c) an Avalanche Photo-Diode (APD).

8. The method of claim 1, wherein:
said portable electronic device is a device from among (a) a cell phone (b) a PDA, (c) a personal multimedia player (PMP) and (d) a MP3 player;
said second device includes at least one of a built in optical transceiver and a separate optical transceiver; and
said method comprises enabling sharing of portions of data contained within the first device and the second device by contemporaneously transmitting data encoded within optical pulses between the first portable electronic device and the transceiver of the second.

9. The method of claim 1, wherein:
the electronic device comprises a power management circuit operatively connected to the data processor and to an illumination light source, wherein the power management circuit selectively drives the light source with power levels optimized for illumination and with power level modulation indicative of a response data generated from the data processor; and
when the data received is a request for activation of a duplex communication link, said method further comprises:
generating a response data from a processor of the first device;
initiating a communication interface on the processor for data transmission;
switching the light source of the first device from an illumination mode to a communication mode,
modulating a light source to produce modulated optical signals indicative of the response data generated from the processor; and
dynamically activating a first power level optimized for completing the modulating of the light source, wherein said response data is transmitted from the first device as the modulated optical signals, which provides optically transmitted data modulated within a light emitted from the light source.

10. The method of claim 1, wherein:
the received optical pulses comprises multiple streams of optically transmitted data, each stream being transmitted at a different wavelength of light;
the optical receiver comprises multiple sub-optical receivers optimized to receive different primary wavelengths of light; and
said method comprises:
detecting the multiple streams within the received optical pulses;
separating the multiple streams of data into individual streams of data;
converting the individual streams of data into received data;
analyzing each individual stream of data separately; and
responding to the received data within each individual stream according to corresponding preset responses for received data at a particular wavelength.

11. The method of claim 1, wherein:
said second device is a digital video recorder (DVR), wherein the digital video recorder has an associated optical transceiver; and
said method comprises transmitting content data via the optical pulses, wherein said content data is transmitted between the first device and the second device to enable digital content to be shared and viewed on the first device or on a video monitor associated with the second device.

12. A method of wireless data communication via an electronic device, said method comprising:
providing a data transfer interface on the electronic device, wherein the data transfer interface supports processing of selected data by a processor of the electronic device that is functionally connected to an illumination light source, which light source is selectively utilized for illuminating a component in the electronic device and for transmitting data via optical pulses;
switching the illumination light source from an illumination mode to a data communication mode;
transmitting from the electronic device via optical pulses, a request for authentication data from a second device to authenticate the second device;

comparing authentication data received in response to said request against a pre-established authentication parameter required for establishing an optical communication link, wherein the authentication data is one or more of (a) a password (b) a biometric sensor input and (c) an electronic token;

enabling transmission of content data from the electronic device to the second device following authentication, wherein content data is only transmitted after authentication of at least the second device; and transmitting a data stream from the electronic device by encoding the data in optical pulses from said illumination light source.

13. A method of wireless data communication via an electronic device, said method comprising:

providing a data transfer interface on the electronic device, wherein the data transfer interface supports processing of selected data by a processor of the electronic device that is functionally connected to an illumination light source, which light source is selectively utilized for illuminating a component in the electronic device and for transmitting data via optical pulses;

switching the illumination light source from an illumination mode to a data communication mode;

requesting entry of an authentication data in the electronic device prior to enabling the electronic device to transmit data to a second device;

comparing the authentication data, provided in response to said requesting, against a pre-established authentication parameter required for the electronic device to transmit data to the second device, wherein the authentication data is one or more of (a) a password, (b) a biometric sensor input and (c) an electronic token; and enabling transmission of data from the electronic device to the second device following authentication, wherein data is only transmitted after authentication of at least the electronic device; and transmitting a data stream from the electronic device by encoding the data in optical pulses from said illumination light source.

14. A method of wireless data communication via an electronic device, said method comprising:

providing a data transfer interface on the electronic device, wherein the data transfer interface supports processing of selected data by a processor of the electronic device that is functionally connected to an illumination light source, which light source is selectively utilized for illuminating a component in the electronic device and for transmitting data via optical pulses;

receiving, at the electronic device via optical pulses, a request for authentication data from a second device to authenticate the electronic device;

switching the illumination light source from an illumination mode to a data communication mode;

transmitting authentication data from the electronic device to the second device by encoding the authentication data in optical pulses from the illumination light source;

comparing authentication data received from said second device in response to said request against a pre-established authentication parameter required for establishing an optical communication link with the second device, wherein the authentication data is one or more of (a) a password, (b) a biometric sensor input, and (c) an electronic token; and enabling transmission of content data from the electronic device to the second device following authentication, wherein content data is only transmitted after authentication of at least the electronic device; and transmitting a data stream of the content data from the electronic device by encoding the content data in optical pulses from said illumination light source.

15. An optical data communication system comprising:

a first electronic device having:

a data processor for generating data for communication with an external device;

an illumination light source which generates visible light for illuminating a component of the first electronic device and which is also selectively utilized for transmitting data via optical pulses, while the illumination light source is in a data communication mode; and data transmission logic for:

providing a data transfer interface on the electronic device, wherein the data transfer interface supports processing of selected data by the processor;

switching the illumination light source from an illumination mode to the data communication mode; and transmitting a data stream from the electronic device by encoding the data in optical pulses from said illumination light source, while the illumination light source is in the data communication mode; and wherein the illumination light source is one type of light source from among different types of light sources comprising (a) a display light source for illuminating a display of the electronic device, (b) a keypad light source, which illuminates a keypad of the portable electronic device when the keypad light source is utilized for illumination, and (c) a self-illuminating, emissive type display of the electronic device;

wherein the first electronic device further comprises: an optical receiver operatively connected to the processor, and operable as a receiver within an optical communication data link, wherein the optical receiver receives a light input having data embedded therein as optically-transmitted data and logic for receiving, via the optical receiver, a second data encoded within a light input; logic that, in response to receiving the light input with data encoded therein, performs the functions of: extracting the second data from the light input; and enabling processing of the data by the processor;

a second electronic device, wherein said transmitting of the data and receiving of the second data is provided on a bidirectional duplex communication link created with a second optical receiver and an optical data transmission mechanism of the second electronic device, wherein: the first data is transmitted via the optical pulses from the first electronic device and is received by the second optical receiver of the second electronic device; and the second data is transmitted from the second electronic device and is received by the first optical receiver of the first electronic device; and wherein said first electronic device further comprises logic for: transmitting, via the optical pulses over the communication link, a request for authentication data from a second device to authenticate the second device; comparing authentication data received in response to said request against a pre-established authentication parameter required for establishing the optical communication link, wherein the authentication data is one or more of (a) a password (b) a biometric sensor input and (c) an electronic token; and enabling transmission of content data from the first device to the second device following authentication, wherein content data is only transmitted after authentication of at least the second device.

16. The optical data communication system of claim 15, wherein the type of illumination light source comprises one of: (a) a backlight of an electronic display; (b) a front light of an electronic display; (c) a backlight of an electronic keyboard; (d) a front light of an electronic keyboard; and (e) a self illuminating display.

17. The optical data communication system of claim 15, wherein:
said first device is a portable electronic device;
said the second device is a second electronic device; and
transmitting said data stream via the optical pulses activates one or more preset functions, including one or more of:
 initiating and establishing the communication link;
 requesting a retransmission of at least a portion of the data transmitted via the communication link when an error in transmission is detected in the received data stream; and
 confirming the completion of data transmission.

18. The optical data communication system of claim 15, wherein the first electronic device further comprises logic for:
 requesting entry of authentication data in the first device prior to enabling the first device to transmit data to a second device;
 comparing the authentication data, provided in response to said requesting, against a pre-established authentication parameter required for the first device to transmit data to the second device, wherein the authentication data is one or more of (a) a password, (b) a biometric sensor input and (c) an electronic token; and
 enabling transmission of data from the first device to the second device following authentication, wherein data is only transmitted after authentication of at least the first electronic device.

19. The optical data communication system of claim 15, wherein:
said first device further comprises logic for:
 receiving from a second device via the optical pulses, a request for authentication data to authenticate the first device; and
 transmitting the authentication data to the second device in response to said request; and
said second device comprises logic for:
 comparing authentication data received in response to said request against a pre-established authentication parameter required for establishing an optical communication link with the first device, wherein the authentication data is one or more of (a) a password, (b) a biometric sensor input, and (c) an electronic token; and
 enabling transmission of content data from the first device to the second device following authentication, wherein content data is only transmitted after authentication of at least the first device.

20. The optical data communication system of claim 15, wherein:
said first electronic device is a portable electronic device and said data includes an unlocking code for an electronic locking mechanism;
said second device is the electronic locking mechanism, which unlocks when a preset unlocking code is received as data encoded within optical pulses of light; and
said electronic locking mechanism unlocks only when the data received via the optical pulse is the preset unlocking code.

21. The optical data communication system of claim 15, wherein:
said first device is a portable electronic device, and said data is payment information for providing electronic payment;
said second device is an electronic transaction mechanism, which accepts payment information as data encoded within an optical pulse received from an illuminating source of a device that is within an optical range of the second device; and
wherein said payment information is one of a credit card number, a financial institution routing number with account number, a debit card number, personal identification information including addressing information for forwarding a request for payment, and reference information for a pre-charged credit account that is automatically debited.

22. The optical data communication system of claim 15, wherein:
said first device is a portable electronic device, from among (a) a cell phone (b) a PDA, (c) a personal multimedia player (PMP) and (d) a MP3 player;
said second device includes at least one of a built in optical transceiver and a separate optical transceiver; and
said first device comprises logic for enabling sharing of portions of data contained within the first device and the second device by contemporaneously transmitting data encoded within optical pulses between the first portable electronic device and the transceiver of the second device.

23. The optical data communication system of claim 15, wherein:
said first device is a portable electronic device;
said second device is a television (TV), wherein the TV has an associated optical transceiver; and
said first device comprises logic for transmitting content data via the optical pulses, wherein said content data is transmitted between the first device and the second device to enable digital content to be shared and viewed on the first device or on a video monitor associated with the second device.

24. The optical data communication system of claim 15, wherein:
the first electronic device comprises a power management circuit operatively connected to the data processor and to an illumination light source, wherein the power management circuit selectively drives the light source with power levels optimized for illumination and with power level modulation indicative of a response data generated from the data processor; and
when the data received is a request for activation of a duplex communication link, said logic further comprises logic for:
 generating a response data from a processor of the first device;
 initiating a communication interface on the processor for data transmission;
 switching the light source of the first device from an illumination mode to a communication mode;
 modulating a light source to produce modulated optical signals indicative of the response data generated from the processor; and
 dynamically activating a first power level optimized for completing the modulating of the light source, wherein said response data is transmitted from the first device as the modulated optical signals, which provides optically transmitted data modulated within a light emitted from the light source.

25. The device of claim 15, wherein the optical receiver comprises one or more of (a) a photodiode, (b) a phototransistor and (c) an Avalanche Photo-Diode (APD).

26. The device of claim 15, wherein said optical receiver is a component of an optical transceiver that is separate from the first electronic device and is communicatively tethered to the first electronic device.

* * * * *